United States Patent [19]

Kant et al.

[11] Patent Number: 4,940,912
[45] Date of Patent: Jul. 10, 1990

[54] BRUSHLESS ELECTRIC MOTOR WITH SELF STARTING ASYMMETRY

[75] Inventors: Michel Kant, Villiers sur Coudun; Jean-Marie Biedinger, Chiry Ourscamps; Roland Quessard, Romorantin; Jacques Galko, La Chappele sur Loire, all of France

[73] Assignees: Societe de Ventilation et d'Electricite Appliquees - Velecta, Romorantin; Gradient, Compiege Cedex, both of France

[21] Appl. No.: 360,976

[22] Filed: Jun. 2, 1989

[30] Foreign Application Priority Data

Jun. 3, 1988 [FR]  France ................. 88 07436

[51] Int. Cl.⁵ ................. H02K 29/10; H02K 3/16
[52] U.S. Cl. ................. 310/162; 310/254; 318/138
[58] Field of Search ............ 310/49 R, 156, 162, 310/67 R, 254, 216; 318/138, 254

[56] References Cited

U.S. PATENT DOCUMENTS

| | | |
|---|---|---|
| 3,377,534 | 4/1968 | Hill . |
| 3,569,806 | 3/1971 | Brailsford . |
| 3,900,780 | 8/1975 | Tanikoshi ................. 318/254 |
| 4,004,168 | 1/1977 | Haydon ................. 310/156 |
| 4,554,491 | 11/1985 | Plunkett . |
| 4,565,955 | 1/1986 | Kubota ................. 310/162 |
| 4,575,652 | 3/1986 | Gogue ................. 310/49 R |
| 4,600,864 | 7/1986 | Sato ................. 310/216 |
| 4,742,258 | 5/1988 | Earle et al. ................. 310/156 |

FOREIGN PATENT DOCUMENTS

| | | |
|---|---|---|
| 0206211 | 12/1986 | European Pat. Off. . |
| 2267650 | 11/1975 | France . |
| 2458933 | 1/1981 | France . |

*Primary Examiner*—Peter S. Wong
*Assistant Examiner*—D. S. Rebsch
*Attorney, Agent, or Firm*—Cushman, Darby & Cushman

[57] ABSTRACT

The motor includes a rotor (2) with permanent magnets and a stator (3) that surrounds the rotor and includes reluctance pads (9, 10) provided to place the rotor (2), upon stopping, in a position where the startup of the motor will be assured. The reluctance pads (9, 10) are asymmetrical with respect to the magnetic axis (A) of the coils of the stator (3) and include notches (4), at least some of which serve to accommodate at least one coil of the stator (3), in order to assure obtaining a maximum winding coefficient.

13 Claims, 3 Drawing Sheets

BRUSHLESS ELECTRIC MOTOR WITH SELF STARTING ASYMMETRY

FIELD OF THE INVENTION

The invention relates to an electric motor with electronic commutation, of the type that includes:

a rotor that includes permanent magnets disposed in such a manner as to define a magnetic rotor axis;

a stator that surrounds the rotor and includes coils intended to be supplied with direct current and defining a magnetic stator axis;

commutation means being provided for judiciously reversing the direction of the flow of current in the coils, so that the electromagnetic torque exerted by the stator on the rotor always acts in the same direction, means sensitive to the position of the rotor being provided to control said commutation means and to reverse the direction of flow of current in the coils, and reluctance pads being furthermore provided in the stator to place the rotor upon stopping in a position where the starting of the motor will be assured.

The invention relates more particularly to such a motor in which the coils of the stator are connected in series and are reduced in number, in particular equaling four, while the commutation means includes a reduced number of transistors, in particular four transistors forming a double bridge.

BACKGROUND OF THE INVENTION

In numerous applications, where driving for rotation is necessary, the so-called "universal" motor is presently used. This motor is simple, is small in size for a predetermined output, and can rotate at relatively high speeds, usually higher than 5000 rpm, which is particularly valuable for means for driving gaseous fluids such as fans, blowers, and in particular hair dryers. Nevertheless, this type of universal motor, which includes a mechanical collector and brushes, has major disadvantages associated with the wear of these elements, spark erosion due to poor commutation, the generation of interference, and the noise it produces.

Electronic commutation motors make it possible to dispense with the collector and brushes of universal motors, but generally involve relatively expensive components that substantially increase the price of the motor.

Moreover, until now, it had been commonly acknowledged that the electronic commutation motor, with reluctance pads, was incapable of functioning correctly except at relatively low rotational speed, for example on the order of 2000 rpm. It was believed that at higher speeds, especially above 5000 rpm, it was no longer possible for such a motor with electronic commutation to function correctly, because of the major antagonistic effect of the reluctance torque at these speeds.

OBJECT AND SUMMARY OF THE INVENTION

The object of the invention, above all, is to furnish an electric motor with electronic commutation of the type defined above that is capable of rotating at speeds as high as those of a universal motor, with good output, at reduced bulk for a given output, and which remains simple in construction and is economical.

According to the invention, an electric motor with electronic commutation of the type defined above is characterized in that the stator includes an even number of notches separated by teeth spaced apart at regular intervals over the entire inside periphery of the stator;

the reluctance pads are asymmetrical with respect to the magnetic stator axis and are formed by two diametrically opposed groups of teeth and notches, the teeth not belonging to the reluctance pads having a lesser length than the length of the teeth belonging to the reluctance pads; and some of the coils of the stator are accommodated in the notches of the reluctance pads and the remainder are accommodated in the notches not belonging to the reluctance pads, such that the coils of the stator are placed in the vicinity of the diametral plane orthogonal to the magnetic axis of the stator, which makes it possible to improve the winding coefficient.

The asymmetry of the reluctance pads with respect to the magnetic axis of the stator contributes to substantially reducing the effect of braking of the reluctance torque, and of permitting rotation at high speeds with satisfactory torque; the improvement of the winding coefficient makes it possible to improve the output of the motor.

Preferably, the axis of the reluctance pads is offset by 45° with respect to the magnetic axis of the coils of the stator.

For an internal stator diameter of approximately 20 mm and an overall height of the teeth of approximately 7.7 mm, the difference in length between the teeth of the reluctance pads and those not belonging to these pads is approximately three-tenths of a millimeter.

Each reluctance pad may have an angular width of approximately 100°.

The stator may include 16 notches and 16 teeth, with the diametrically opposed reluctance pads each including five teeth and four notches, while the six remaining teeth form two diametrically opposed groups of three teeth having a reduced length, two coils being accommodated in two notches of the reluctance pads located toward one angular end of these pads, while the other two coils of the stator are accommodated in the two immediately adjacent notches, which are not part of the reluctance pads.

For a sufficient axial length of the stator, in particular for a length greater than 20 mm, the notches of the stator are preferably inclined by a predetermined angle with respect to the generatrices, in such a manner as to reduce the effect of the harmonics of the teeth on the electromagnetic torque.

Advantageously, the rotor is equipped with magnets based on rare earths, in particular cobalt-samarium. These magnets may have the shape of a round tile comprising a cylindrical portion, the center angle of which is between 110° and 140° and in particular is in the vicinity of 125°.

The means sensitive to the position of the rotor may include on the one hand a device such as a disk or the like, locked onto the shaft of the rotor and including zones of different contrast, in particular a light zone and a dark zone, and on the other hand a photoelectric sensor arranged to receive a brightness signal originating in these zones and to produce an electrical signal used for controlling the reversal of direction of the current in the coils.

The device, disk or the like may include two dark sectors, of which the trailing ends, in the direction of rotation of the rotor, are diametrically opposed and are angularly locked, like the sensor, to correspond to the desired commutation times.

Advantageously, one dark sector extends over more than 90 and less than 180°, while the other dark sector extends over less than 90°, the light sectors extending between the dark sectors.

A suitable logic circuit is provided to control the proper direction of the current in the coils of the stator, so that the rotation of the rotor obtained is always in the desired direction, depending on whether a dark or a light sector is perceived by the sensor when the motor is at a stop.

Generally, the photoelectric sensor includes an emitter, in particular of infrared radiation.

In a variant, the means sensitive to the position of the rotor include a Hall effect sensor, arranged to produce an electrical signal for controlling the reversal in direction of the current in the coils in response to the passage of at least one magnet carried by a device, such as a disk or the like, locked onto the shaft of the rotor.

The rotational speed of a motor with electronic commutation according to the invention may be on the order of 13,000 rpm.

A particularly important application of such a motor relates to driving machines for the displacement of fluids, in particular gaseous fluids, such as a blower, fan or in particular a hair dryer, in which the startup of the motor is effected with a practically zero charge (substantially zero torque resistant to the startup).

The invention also relates to a machine for displacing a fluid, in particular a gaseous fluid, and in particular a hair dryer or hand dryer, generally portable, characterized in that it is equipped with a motor with electronic commutation as defined above.

The invention, based on the above explanation, comprises a certain number of other arrangements to be described in greater detail below in terms of an exemplary embodiment described in conjunction with the accompanying drawings, which however, is in no way limiting.

DESCRIPTION OF THE PREFERRED EMBODIMENT

Figure 1:
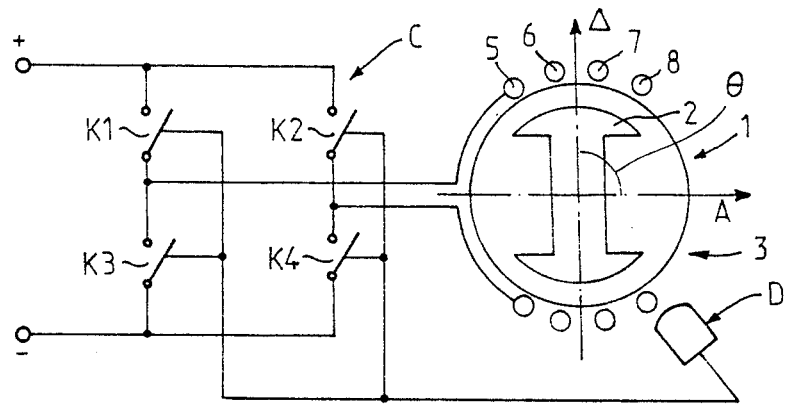
FIG. 1 is a simplified diagram of a motor with electronic commutation.

Turning first to FIG. 1, some remarks will be made with respect to electric motors with electronic commutation.

Such a motor 1 includes a rotor 2, provided with permanent magnets, and a stator 3, which surrounds the rotor and includes notches such as 4 (see FIG. 2), in which coils such as 5 are accommodated, which are intended to be supplied with direct current and define a magnetic axis A of the stator. In the following description, it is assumed that the stator axis A is horizontal and comprises the reference axis. It will be understood that in practice this axis may be oriented differently.

In the exemplary embodiment in question, the stator 2 includes a single master controllable winding, formed of four bobbins 5, 6, 7 and 8, connected in series.

The magnets of the rotor define a magnetic axis $\Delta$ of the rotor.

When the angle $\theta$ between the magnetic axis A of the stator and the magnetic axis $\Delta$ of the rotor differs from zero, up to approximately $k\pi$, an electromagnetic torque appears between the stator and the rotor, this torque having a tendency to align the magnetic axis of the rotor on the stator axis.

For a given direction of the flow in the stator coils, the electromagnetic torque will be assumed to be positive for $\theta$ varying from zero to $\pi$.

In order for the electromagnetic torque exerted on the rotor to maintain the same direction when $\theta$ varies from $\pi$ to $2\pi$, the direction of current in the winding of the stator is reversed with the aid of commutation means C.

A new reversal of the flow of current in the stator must take place when $\theta$ exceeds the value of $2\pi$.

In summary, the reversals of current are controlled for values of $\theta=0$ and $\pi$ to approximately $2k\pi$. The electromagnetic torque obtained has the course of a rectified sine wave; that is, the negative alternations have been replaced with positive alternations.

The commutation means C include four transistors K1, K2, K3, K4, forming a double bridge between the direct supply voltage terminals, the transistors being shown schematically in the form of a simple switch. The switches K1, K3 are connected in series between the supply terminals, as are the switches K2 and K4. The stator winding is connected at each of its ends to a middle point located between two switches.

The control of these switches is performed such that K1, K4 are closed simultaneously, while K2, K3 are open; for this connection, the current flows in one direction in the stator winding. To obtain a flow of the current in the reverse direction, the simultaneous closure of the switches K2, K3 and opening of the switches K1, K4 is assured.

The control of the switches is assured by means D sensitive to the angular position of the rotor 2. Means D, as explained later, advantageously includes an electric sensor combined with a device such as a disk locked on the shaft of the rotor that includes dark and light zones.

The exemplary embodiment in question is particularly simple, in accordance with the intended object, since the stator includes only a single winding and the commutation means includes merely four switch transistors.

In such a motor, the electromagnetic torque vanishes every $k\pi$, such that if the rotor 2 can stop in such a position, the rotor will not start up again later.

To prevent such a disadvantage, two reluctance pads are provided in the stator, to place the rotor 2 at the stop in a position where the startup of the motor will be assured. The phenomenon of reluctance tends to place the rotor 2 in the position where the air gap is minimal. These pads project radially toward the inside with respect to the inside surface of the stator, and the rotor 2, each time it stops, is positioned in the axis of these pads.

The presence of such reluctance pads causes a reluctance torque to appear when the rotor 2 rotates, this torque having a frequency twice that of the electromagnetic torque, which is combined with the reluctance torque.

According to the invention, to optimize the electric motor with electronic commutation and in particular to improve its output and allow it to rotate at high speeds, reluctance pads 9, 10 (see FIG. 2 where the zone of the reluctance pads is delimited by dotted lines for clarity) are provided that are asymmetrical with respect to the axis A of the stator coils, and which include notches 4, at least one portion of which serves to accommodate at least one stator coil 3, in order to assure that a maximal winding coefficient will be obtained.

Operating in this way, the antagonistic effects of the reluctance couple on the desired functioning of the motor are diminished, and this reluctance couple is made maximum use of for rotation in the desired direction; moreover, because of the use of notches provided in the reluctance pads, the coils can be placed in the vicinity of the diametral plane orthogonal to the magnetic axis A of the stator, which, as will be explained in further detail below, improves the winding coefficient and makes it possible to improve the output of the motor.

Figure 2:
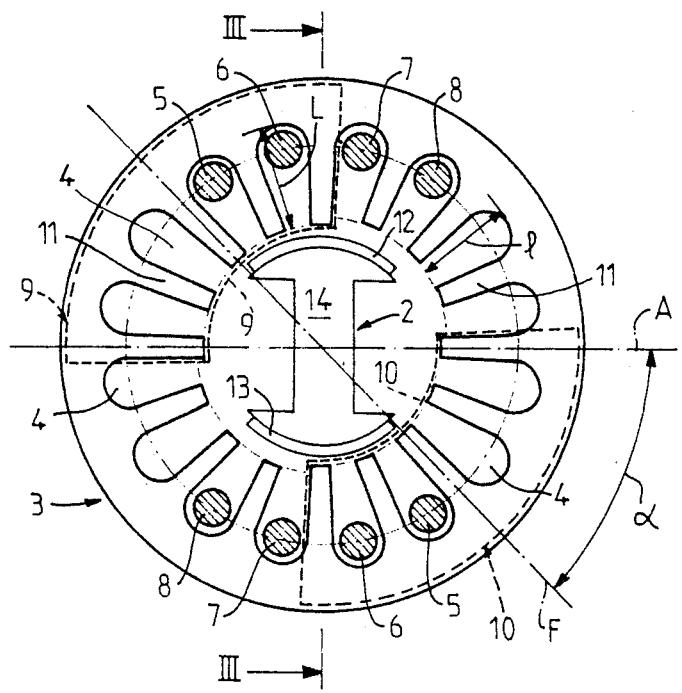
FIG. 2 is an elevation view of a motor according to the invention.

As can be seen in FIG. 2, the axis F of the reluctance pads 9, 10 is offset by an angle $\alpha$, advantageously equal to 45°, with respect to the magnetic axis A of the stator coils.

The stator 3 includes an even number of notches 4, separated by teeth 11, distributed at regular intervals over the entire inside periphery of the stator.

The reluctance pads 9, 10 are formed by two diametrically opposed groups of teeth 11 and notches 4. The teeth 11 that do not belong to the reluctance pads have a length l, along the radial direction, which is slightly less than the length L of the teeth belonging to the pads 9 and 10.

Each reluctance pad extends angularly along an angle preferably between 80° and 120°, and advantageously close to 100°.

In the exemplary embodiment shown in FIG. 2, the stator 3 includes 16 notches 4 and 16 teeth 11. Each reluctance pad, as can be seen in FIG. 2, is formed by the set of five teeth 11 and four notches 4. Each group of five teeth extends substantially over a range of 100°. The two groups are diametrically opposed.

The six remaining teeth, of length l, form two other diametrically opposed groups.

The stator winding, which is formed of four coils wound in series, includes two coils 5, 6 accommodated in two notches of the reluctance pads located toward one angular end of the pads, that is, the upper end for the pad 9 and the lower end for the pad 10, while the other two coils 7 and 8 of the stator are accommodated in the immediately adjacent notches 4 that do not belong to the reluctance pad.

In the more precise example of an embodiment of an electric motor for drying the hands, the inside diameter of the stator is on the order of 20 mm, the height L of the teeth 11 is approximately 7.7 mm, and the difference in length L - 1 is on the order of three-tenths of a millimeter (0.3 mm), the outer diameter of the rotor being on the order of 19 mm.

The winding coefficient Kbob corresponds to the ratio of the vectorial sum of all the electromotive forces generated by the various coils with the product N·E, where N is the total number of turns in all the coils connected in series, and E is the amplitude of the electromotive force produced by each coil.

Figure 5:
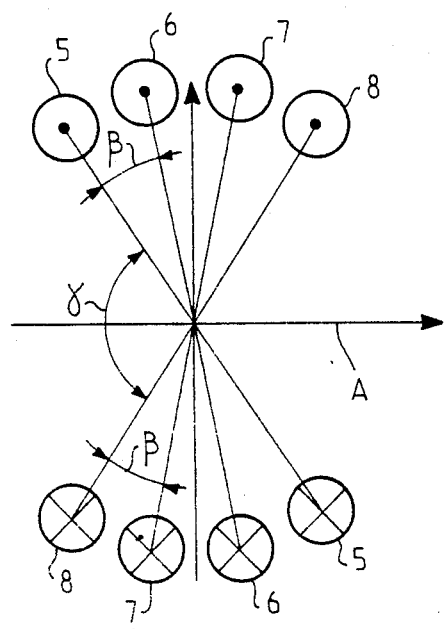
FIG. 5 is a diagram of the arrangement of the coils of the stator.

The positions of the four coils have been shown in FIG. 5, with the angular spacing among them corresponding to the stator of FIG. 2 and the magnetic axis of the stator being the horizontal axis in this FIG. 5. The acute angle $\beta$ between the median plane of the coils 5 and 6 is equal to that existing between the median plane of the coils 7 and 8. In the example shown in FIG. 2, as in FIG. 5, this angle $\beta = 22.5°$ (that is, 360°/16). The angle $\gamma$ between the median plane of the coils 5 and 8 = 110° in the exemplary embodiment of FIG. 2, this value having been shown in FIG. 5.

The direction of the flow of current in the coils is shown schematically as an arrowhead (a circle with a dot in the center), when the current flows from the back to the front of the plane of the drawing, and by the tail of an arrow (circles with xs in them) for the opposite direction.

Figure 6:
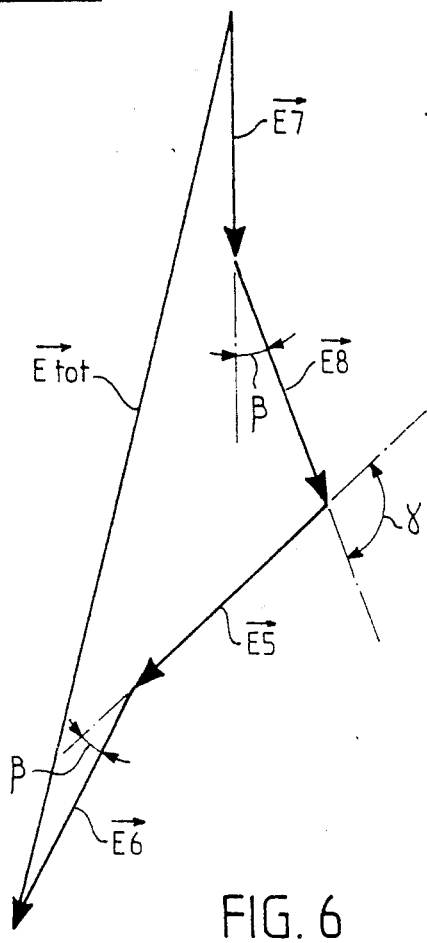
FIG. 6 is a graph for determining the winding coefficient.

The vectorial sum of all the electromotive forces produced by the various coils is shown in FIG. 6. The coils all have the same number of turns and the same diameter, so the amplitude of the electromotive force produced by each coil is the same.

The electromotive force produced by the coil 7 is shown in FIG. 6 as the vector E7 oriented vertically from top to bottom. The electromotive force of the coil 8 is represented by the vector E8, having the same norm as E7, but offset angularly by the angle beta with respect to E7. The electromotive force produced by the coil 5 is represented by the vector E5, of the same norm as the preceding vectors, but forming an angle of $(\gamma - \pi)$ with respect to the vector E8. Finally, the electromotive force produced by the coil 6 is represented by the vector E6, of the same norm as the preceding ones, but forming an angle with the vector E5. The resultant electromotive force is represented by the vector Etot. In the example in question, where the angle $\beta$ is 22.5° and the angle $\gamma$ is 110°, the norm of the vector Etot is equal to 3.6 times the norm of the elementary vectors. The winding coefficient hence is Kbob = 3.6/4 = 0.9, which corresponds to a very good winding coefficient. This is explained by the fact that the coils, as can be seen in FIG. 5, are practically diametrical; that is, their median plane is close to the plane orthogonal to the magnetic axis A of the stator.

Figure 3:
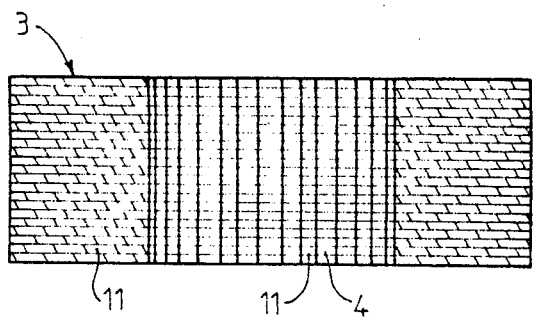
FIG. 3 is a sectional view of the stator along the line III—III of FIG. 2, the section having been rotated by 90°.
Figure 4:
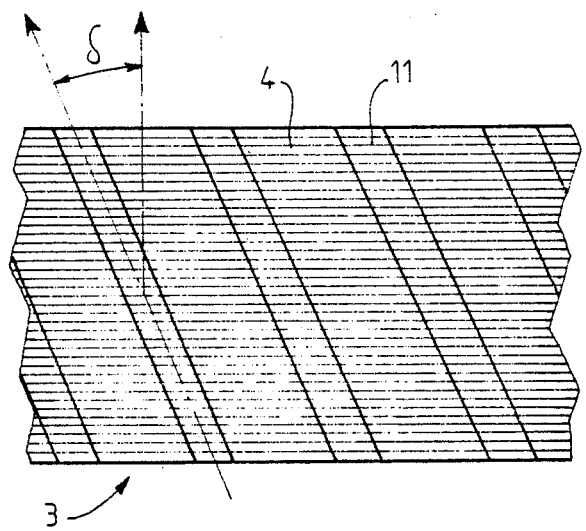
FIG. 4 shows a variant embodiment of the teeth and notches of the stator.

When the thickness of the stator, that is, its dimension along its axis, is relatively great, for example greater than 20 mm, then as partially shown in FIG. 4, notches 4 may be provided that are inclined by a predetermined angle with respect to the generatrices of the cylinder forming the inside surface of the stator, in such a manner as to reduce the effect of the tooth harmonics on the electromagnetic torque. In the case of FIG. 3, the notches are parallel to these generatrices.

To obtain the inclination δ, the stator laminations are offset angularly by a desired quantity from one another, and the stack of these laminations comprises the stator.

The rotor 2 (see FIG. 2) is equipped with magnets 12, 13 based on rare earths, in particular magnets based on cobalt-samarium. Each magnet has the shape of a round tile comprising a portion of a cylinder, the angle at the center of which is between 110° and 140°, and preferably close to 125°. The radius of curvature of the outer surface of the magnets is substantially equal to the radius of the inside surface of the stator.

The magnets 12 and 13 are fixed, in particular by gluing, to the two diametrically opposed, flared pole ends of the core 14 of soft iron of the rotor.

Figure 7:
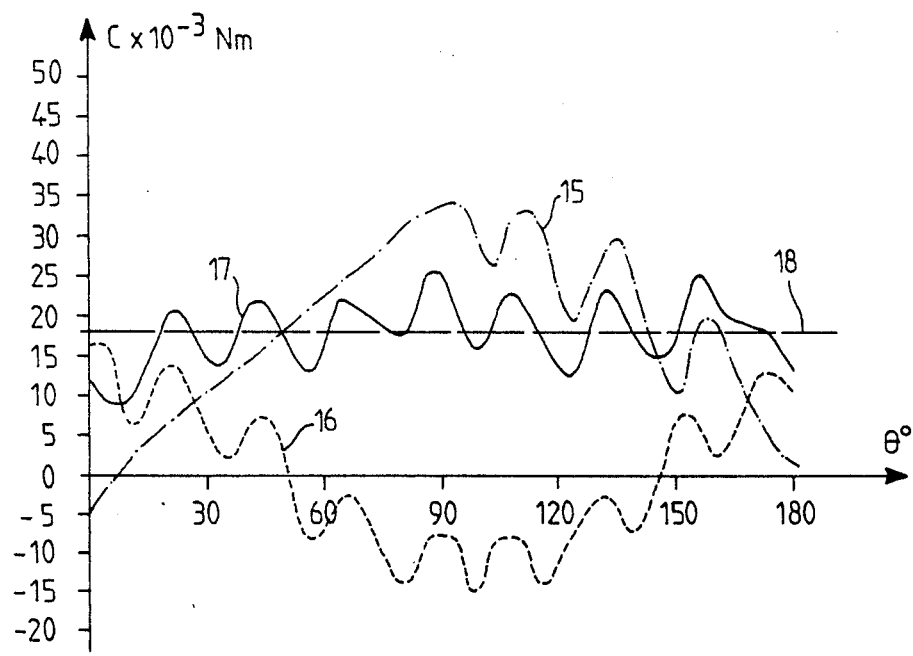
FIG. 7 is a graph showing the variations in the electromagnetic torque in dot-dash lines, the reluctance torque in dashed lines, and the resultant torque of the motor in solid lines, as a function of the angle of rotation.

FIG. 7 is an illustration of the torque obtained with a motor according to the invention. This curve is represented by an angular zone from 0° to 180°, that is, an angular zone corresponding to the period of the torque.

The torque is plotted on the ordinate; the graduations of the ordinate should be multiplied by $10^{-3}$ Nm to obtain the value of the torque in the example in question (length of rotor, 15 mm; internal stator diameter, 20 mm).

The dot-dash line curve 15 represents the variations in the electromagnetic torque produced by the interaction of the electromagnetic field of the stator with the magnetic field of the rotor.

The curve 16, in dot-dash lines, represents the variations in the reluctance torque.

The variations in total torque are represented by the curve 17 in solid lines which results from the addition of the preceding two curves.

It is clear from this FIG. 7 that the reluctance torque is positive for the angular zones in which the electromagnetic torque is slight or negative, while the reluctance torque is negative when the electromagnetic torque is strongly positive. Thus the combination of the reluctance torque with the electromagnetic torque according to the invention results in a total torque of which the fluctuations about a mean value, corresponding to the straight line 18 parallel to the axis of the abscissa, are relatively slight, while the mean value of the torque corresponding to this straight line 18 is relatively high.

The reluctance torque remains excellent, to assure the positioning of the rotor 2 upon stopping.

Figure 8:
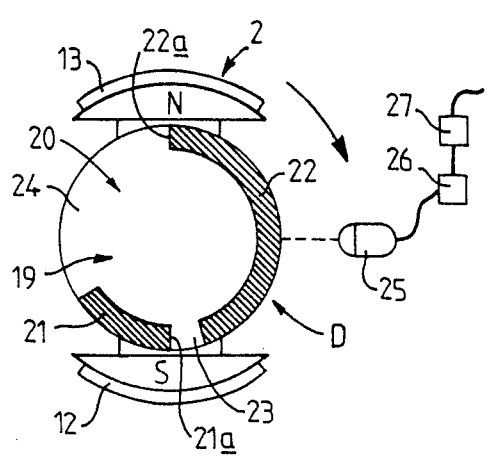
FIG. 8 is a schematic illustration of the rotor and a disk locked onto the shaft of this rotor, as well as a photoelectric transmitter and sensor associated with this disk.

Turning to FIG. 8, it can be seen that the means D sensitive to the position of the rotor 2 includes a device 19, such as a disk 20 or the like, locked on the shaft of the rotor 2 and including zones of different contrast, in particular a light zone and a dark zone and especially a white zone and a black zone. In the example here, the disk 20 includes two dark zones or sectors 21, 22, the trailing ends 21a, 22a of which, in the direction of rotation of the rotor (clockwise, in FIG. 8), are diametrically opposed.

The sector 21 extends along an angle equal to at most 90°; in the case of FIG. 8, the angle of sector 21 is on the order of 60°. The sector 22 extends over an angle greater than 90° and less than 180°; in the case of FIG. 8, the sector 22 extends over an angle of approximately 160°.

The two dark sectors 21, 22 are separated by two light sectors 23, 24.

The ends 21a and 22a are locked angularly in such a manner as to correspond to the desired commutation times, that is, they are locked on the magnetic axis of the rotor 2.

The means D further includes a photoelectric sensor 25, which includes an infrared radiation emitter directed along the sectors of the disk 20, and a receiver sensitive to the radiation returned by the disk sector struck by the radiation.

The emitter beam of the sensor 25 is angularly locked on the magnetic axis of the stator. The unit is arranged such that when the radiation falls on a dark sector, such as 21, 22, the radiation returned to the receiver of the sensor 25 is insufficient to produce a signal at the output of this receiver; contrarily, when the radiation emitted falls on a light sector, such as 23, 24, the receiver of the sensor 25 emits a signal at its output corresponding for example to a logic level "1". This signal is used to control the reversal of the direction of the current in the stator coil.

The sensor 25 is preferably associated with control means 26 arranged to effect the reversal in the direction of the current in the coils solely for the leading edges of the signals produced by the sensor 25. A leading edge corresponds to the passage of the beam of light originating in the emitter of the sensor 25 from a dark sector such as 21 or 22 to a light sector. Means 26 may include a monostable circuit triggered solely by the leading edges of the signals of the sensor.

The stopping position of the rotor is defined at approximately 180° by the reluctance pads.

To assure the startup of the rotor in the direction of rotation desired, the current must be made to flow in the coils 5, 6, 7 and 8 of the stator in one direction or the other, depending on the position of the rotor upon stopping.

The combination of dark zones 21 and 22 shown in FIG. 8 makes it possible to distinguish between whether the south pole S of the rotor is at the top or bottom upon stopping, as shown in FIG. 8. When the south pole is located at the bottom, as shown in FIG. 8, the sensor 25 sees the dark zone 22 when the rotor stops, while contrarily if the north pole N is located at the bottom upon stopping, the sensor will see the light sector 24.

A logic circuit 27 is combined with the sensor 25 to control the appropriate direction of current in the coils 5-8 at the startup of the motor, depending on whether the signal at the output of the sensor 25, when the motor is stopped, corresponds to a logic "0" (which is the case if the sensor 25 sees the sector 22 upon stopping) or to a logic "1" (which is the case when the sensor 25 sees the sector 24 upon stopping).

Since the startup of the motor is assured in the desired direction, the commutation subsequently takes place normally.

Figure 9:
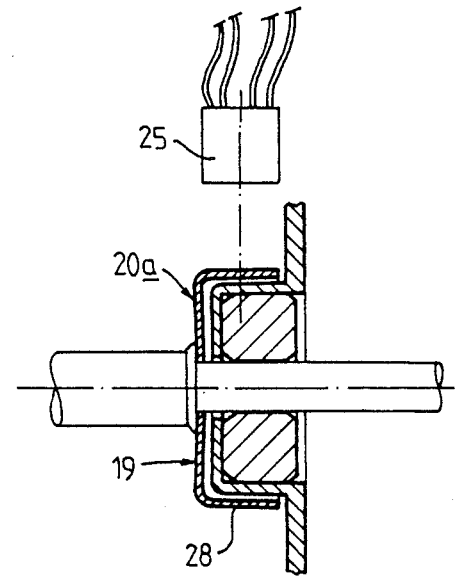
FIG. 9 shows a variant embodiment in which the disk of FIG. 8 is replaced with a drum.

FIG. 9 illustrates a variant embodiment, in which the device 19, instead of comprising a disk as in the case of FIG. 8, comprises a drum 20a, wedged on the axis of the rotor; the dark and light sectors are provided on the external surface of the cylindrical wall 28 of this drum. This sensor 25 is aimed toward this wall 28 while being spaced radially apart from it, as shown in the drawing.

The arrangement of the dark and light sectors, and the functioning of the entire assembly, are similar to those described in conjunction with FIG. 8.

In a variant, the disk 20 may include only two zones (or sectors), with one black or dark and the other light, instead of the four sectors 21-24 provided in FIG. 8.

Only two power transistors, instead of the four provided in FIG. 1, may be used, in combination with a midpoint voltage source.

The optical sensor may be selected so as to permit the use of the leading and the trailing edges of its signal to control the saturation of these two power transistors successively.

In another variant, the sensor arranged to control the transistors, for reversing the current, is a Hall effect sensor, which consumes less power than an optical sensor and is insensitive to pollution. At least one magnet is fixed on a disk attached to the rotor, and the Hall effect sensor flips over when this magnet passes before it.

The invention makes it possible to obtain a motor with electronic commutation capable of rotating at high speeds, in particular on the order of 13,000 rpm, of reduced bulk for a given power, which is particularly silent and reliable. Such a motor is particularly well adapted to driving a machine for displacing a gaseous fluid, and more particularly still to a portable or stationary hair dryer.

What is claimed is:

1. An electric motor with electronic commutation, including:
   a rotor (2) which includes permanent magnets (12, 13) disposed in such a manner as to define a magnetic rotor axis;
   and a stator (3) that surrounds the rotor and includes coils (5, 6, 7, 8) intended to be supplied with direct current, and defining a magnetic stator axis (A),
   commutation means (C) being provided for reversing the direction of the flow of current in the coils, so that the electromagnetic torque exerted by the stator (3) on the rotor (2) always acts in the same direction,
   means (D) sensitive to the position of the rotor being provided for controlling the commutation means (c) and for reversing the direction of flow of the current in the coils,
   reluctance pads (9, 10) being further provided in the stator (3) for placing the rotor (2) upon stopping in a position in which the startup of the motor will be assured, wherein
   said stator (3) includes an even number of notches (4) separated by teeth (11) spaced at regular intervals over the entire inside periphery of the stator (3),
   said reluctance pads (9, 10) are asymmetrical with respect to the magnetic stator axis (A) and are formed of two diametrically opposed groups of teeth and notches, the teeth not belonging to the reluctance pads having a length (l) less than the length (L) of the teeth belonging to the reluctance pads,
   said coils (5, 6, 7, 8) of the stator are accommodated in part (5, 6) in the notches of the reluctance pads (9, 10) and the remainder in the notches not belonging to the reluctance pads, such that said stator coils (5, 6, 7, 8) are placed in the vicinity of the diametral plane orthogonal to the magnetic axis (A) of the stator, so as to improve the winding coefficient, said axis of the reluctance pads being offset by 45° with respect to the magnetic axis (A) of the coils of the stator, each reluctance pad having an angular length of approximately 100°.

2. The electric motor as defined in claim 1, wherein said coils (5, 6, 7, 8) of the stator are reduced in number, in particular equal to four, and are connected in series, while said commutation means (C) includes a reduced number of transistors, in particular four transistors (K1, K2, K3, K4) forming a double bridge.

3. The motor as claimed in claim 1, wherein the means sensitive to the position of the rotor includes a device locked on the shaft of the rotor and including portions of different contrast and a photoelectric sensor disposed to receive a light signal reflected from said portions and to produce an electrical signal used for the control of the reversal of the direction of the current in the coils, characterized in that the motor includes control means capable of determining the direction of the reversal of the current in the coils of the stator solely for the leading edges of the signals produced by the sensor, a leading edge corresponding to the passage from a dark portion to a light portion in front of the sensor.

4. The motor as defined in claim 1, wherein the length (l) of the teeth (11) that do not belong to the reluctance pads (9, 10) is less by approximately three-tenths of a millimeter than that of the teeth belonging to the reluctance pads, for a total height (L) of teeth of approximately 7.7 mm, and an inside diameter of the stator (3) of approximately 20 mm, the outer diameter of the rotor (2) being on the order of 19 mm.

5. A hair dryer equipped with a motor as defined in claim 1.

6. An electric motor with electronic commutation, including:
   a rotor (2) which includes permanent magnets (12, 13) disposed in such a manner as to define a magnetic rotor axis;
   and a stator (3) that surrounds the rotor and includes coils (5, 6, 7, 8) intended to be supplied with direct current, and defining a magnetic stator axis (A),
   commutation means (C) being provided for reversing the direction of the flow of current in the coils, so that the electromagnetic torque exerted by the stator (3) on the rotor (2) always acts in the same direction,
   means (D) sensitive to the position of the rotor being provided for controlling the commutation means (c) and for reversing the direction of flow of the current in the coils,
   reluctance pads (9, 10) being further provided in the stator (3) for placing the rotor (2) upon stopping in a position in which the startup of the motor will be assured, wherein
   said stator (3) includes an even number of notches (4) separated by teeth (11) spaced at regular intervals over the entire inside periphery of the stator (3),
   said reluctance pads (9, 10) are asymmetrical with respect to the magnetic stator axis (A) and are formed of two diametrically opposed groups of teeth and notches, the teeth not belonging to the reluctance pads having a length (l) less than the length (L) of the teeth belonging to the reluctance pads,
   said coils (5, 6, 7, 8) of the stator are accommodated in part (5, 6) in the notches of the reluctance pads (9, 10) and for the remainder in the notches not belonging to the reluctance pads, such that said stator coils (5, 6, 7, 8) are placed in the vicinity of the diametral plane orthogonal to the magnetic axis (A) of the stator, so as to improve the winding coefficient, said axis of the reluctance pads being offset by 45° with respect to the magnetic axis (A) of the coils of the stator, said stator including sixteen notches and sixteen teeth, the reluctance pads each including five teeth and four notches and being diametrically opposed, the six remaining teeth forming two groups also diametrically opposed and having a reduced length, two coils being accommodated in two notches of the reluctance pads located toward one angular end of these pads, while the other two coils of the stator are accommodated in the two immediately following notches.

7. The motor as defined in claim 1, wherein the notches of the stator (3) are inclined by a predetermined angle (delta) with respect to the generatrices, in such a manner as to reduce the effect of the tooth harmonics on the electromagnetic torque.

8. The motor as defined in claim 1, wherein rotor (2) is equipped with permanent magnets (12, 13) based on rare earths.

9. The motor as defined in claim 8, wherein the permanent magnets (12, 13) have the shape of a round tile, the angle at the center of which is between 110° and 140°.

10. The motor as defined in claim 1, wherein its speed of rotation is on the order of 13,000 rpm.

11. The motor as defined in claim 3, wherein the device (19) includes two dark portions (21, 22), the trailing ends of which, in the direction of rotation of the rotor, are diametrically opposed and angularly locked, in the same manner as the sensor (25), to correspond to the desired commutation times.

12. The motor as defined in claim 11, wherein a dark portion (22) extends over more than 90° and less than 180°, while the other dark sector (21) extends over at least 90°, the light sectors (23, 24) extending between the dark portions.

13. The motor as defined in claim 11, wherein for detecting the stopping position of the rotor (2) and determining the direction to be given to the current in the coils of the stator (3) so that the same direction of rotation of the rotor will always prevail, a logic circuit (27) is provided to control the suitable direction of the current in the coils of the stator depending on whether a dark sector (22) or light sector (24) is seen by the sensor (25) when the motor is at a stop.

* * * * *